(12) United States Patent
Ovadia

(10) Patent No.: US 7,162,732 B2
(45) Date of Patent: Jan. 9, 2007

(54) SYSTEM AND RELATED METHODS FACILITATING THE DETECTION AND ACQUISITION OF A DATA CHANNEL IN A CABLE MODEM

(75) Inventor: Shlomo Ovadia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 984 days.

(21) Appl. No.: 09/819,118

(22) Filed: Mar. 27, 2001

(65) Prior Publication Data

US 2002/0144290 A1    Oct. 3, 2002

(51) Int. Cl.
*H04N 7/173* (2006.01)

(52) U.S. Cl. ............. 725/131; 725/119; 725/120; 725/129; 375/221; 375/261; 375/375; 375/376

(58) Field of Classification Search ........... 725/111, 725/116, 119, 129, 131, 151, 148, 149; 370/252, 370/466, 395.64, 474; 348/571; 375/220, 375/221, 222, 261, 257, 375
See application file for complete search history.

(56) References Cited

U.S. PATENT DOCUMENTS

| | | | |
|---|---|---|---|
| 4,410,911 A | 10/1983 | Field et al. | |
| 5,790,806 A | 8/1998 | Koperda | |
| 6,122,334 A | 9/2000 | Hughes | |
| 6,125,148 A | 9/2000 | Frodigh et al. | |
| 6,230,326 B1 | 5/2001 | Unger et al. | |
| 6,456,627 B1 | 9/2002 | Frodigh et al. | |
| 6,483,829 B1 | 11/2002 | Yamamoto | |
| 6,510,162 B1 | 1/2003 | Fijolek et al. | |
| 6,574,796 B1 | 6/2003 | Roeck et al. | |
| 6,662,135 B1 * | 12/2003 | Burns et al. | 702/120 |
| 6,671,328 B1 | 12/2003 | Poon et al. | |
| 6,678,893 B1 | 1/2004 | Jung | |
| 6,735,245 B1 | 5/2004 | Palm | |
| 6,742,187 B1 | 5/2004 | Vogel | |
| 6,763,025 B1 * | 7/2004 | Leatherbury et al. | 370/395.64 |
| 6,799,030 B1 | 9/2004 | Barber et al. | |
| 6,804,262 B1 | 10/2004 | Vogel et al. | |
| 6,842,429 B1 | 1/2005 | Shridhar et al. | |
| 6,857,132 B1 * | 2/2005 | Rakib et al. | 725/114 |
| 6,889,385 B1 * | 5/2005 | Rakib et al. | 725/119 |
| 6,987,754 B1 | 1/2006 | Shahar et al. | |

* cited by examiner

*Primary Examiner*—Kieu-Oanh Bui
(74) *Attorney, Agent, or Firm*—Blakely, Sokoloff, Taylor & Zafman LLP

(57) ABSTRACT

A method is presented comprising receiving a broadband signal at a receiver in accordance with a first modulation technique, tuning the receiver to a channel within the broadband signal, and modifying one or more operational parameters of the receiver to demodulate the channel in accordance with a second modulation technique to determine whether the channel is a data channel.

24 Claims, 7 Drawing Sheets

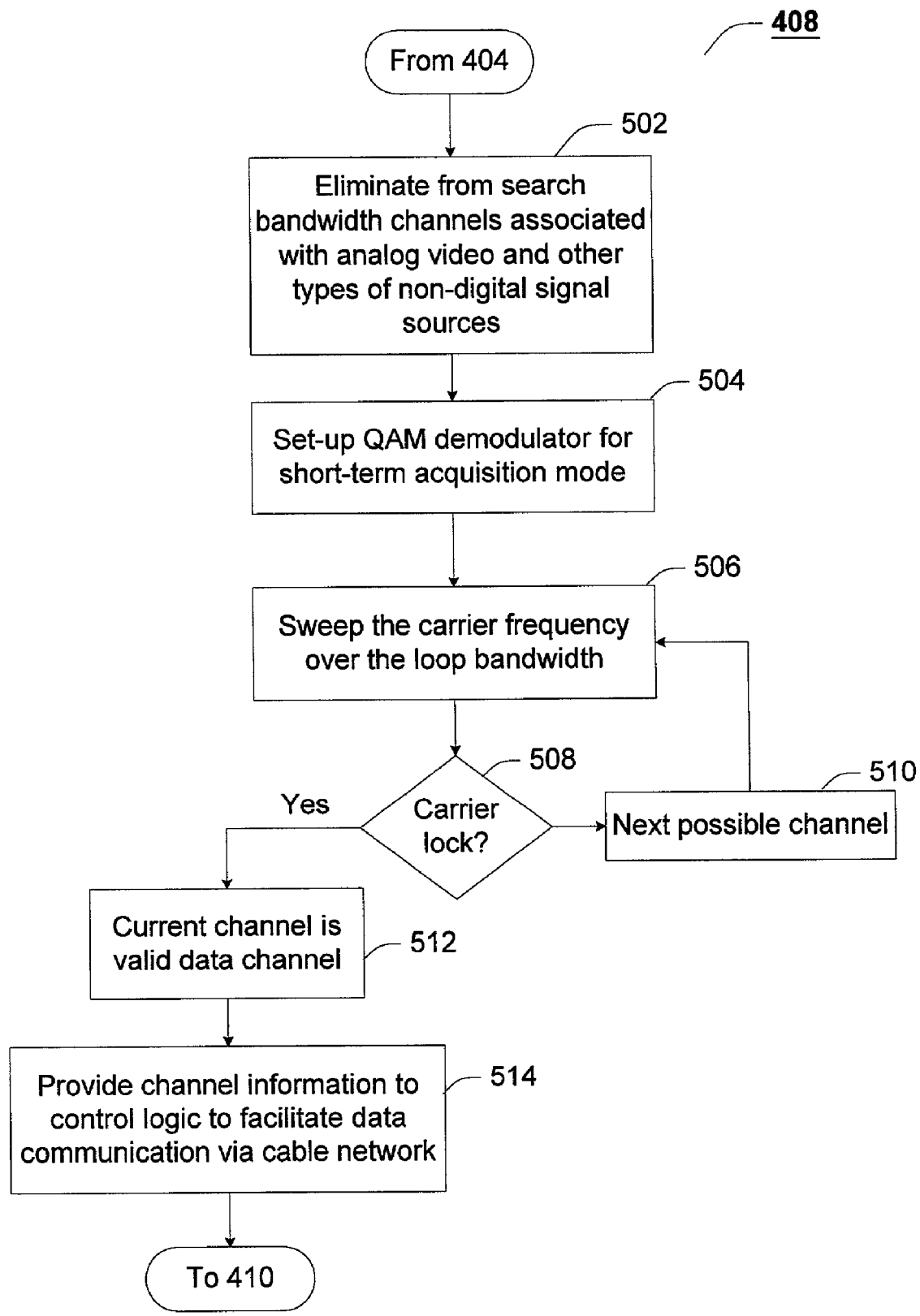

SYSTEM AND RELATED METHODS FACILITATING THE DETECTION AND ACQUISITION OF A DATA CHANNEL IN A CABLE MODEM

TECHNICAL FIELD

This invention generally relates to broadband data networks and, more particularly, to a system and related methods facilitating the detection and acquisition of data channel(s) in a cable modem.

BACKGROUND

With the increased popularity of the Internet has come increasing demand for faster means of accessing the information on the Internet. To meet this demand, broadband technologies such as, for example, the Digital Subscriber Line (DSL), Hybrid Fiber/Coax (HFC) using the cable system, and wireless point-to-point networks are being delivered right to the residential consumer. As the prices associated with the use of such technology have come down, the acceptance of the technology and install rates have soared. An example architecture for a broadband network is provided below, with reference to FIG. 1.

Turning to FIG. 1 an example HFC CATV system is presented, in accordance with one example embodiment. In accordance with the illustrated example embodiment, HFC network 100 is depicted comprising a master headend 102, coupled to a number of primary hubs 104A–N via a communication network 106. Each of the primary hubs 104A–N are coupled to secondary hubs 108A–N and, subsequently, a number of fiber nodes 110A–N in a tree-branch configuration as shown. According to one implementation of the HFC network 100, network 106 includes synchronous optical network (SONET) equipment that communicates over single mode fiber (SMF), and the fiber optic communication path extends to the fiber node(s) 110. Each of the fiber nodes 110 provides cable service to network end-points (e.g., residential drops, commercial drops, etc.) via a broadband coaxial connection 112, using repeater amplifiers 114A–N, as needed.

It will be appreciated by those skilled in the art that in order to use any of the broadband systems introduced above, a broadband modem (modulator/demodulator) is required. In accordance with the illustrated cable television example, a cable modem is required. Cable modems, first developed in the early 90's, enable a computing system to utilize one or more channels of the broadband signal for the interchange of data with, for example, Internet network elements (e.g., web servers, etc.). In this regard, cable modems modulate/demodulate data channels in an unused section of the broadcast bandwidth of the cable television (CATV) system.

FIG. 1 also illustrates a typical residential drop 116 of the HFC network 100 as comprising a splitter 118, which provides a CATV signal to one or more A/V systems 120, as well as to one or more computing systems 124 through a cable modem 124. In accordance with the Data Over Cable Service Interface Specification (DOCSIS 1.1) Radio Frequency Interface Specification SP-RFIv1.1–106–001215 first released Mar. 11, 1999 by the CableLabs® consortium, conventional fiber nodes 11A–N typically broadcast (i.e., forward or downlink component) to network end-points using M-ary quadrature amplitude modulation (QAM) (e.g., 64- or 256 QAM) in 6 MHz channels over a band from 91–857 MHz. In the upstream, (i.e., reverse or uplink component) a cable modem 122 transmits in bursts to the fiber node 11A–N using Reed-Solomon encoding and quadrature phase shift-keying (QPSK) or QAM-16 in one of the following channel widths (−30 dB bandwidth) of 200-kHz, 400-kHz, 800-kHz, 1.6-MHz, and 3.2-MHz from 5 to 42-MHz (5–65-MHz for EuroDOCSIS). Simply stated, QAM is a combination of phase shift-keying and amplitude shift-keying. That is to say, the information to be transmitted in a QPSK signal is modulated in phase shifts, while the information to be transmitted in a QAM signal is modulated in phase and amplitude shifts, i.e., the differences in phase and amplitude.

In accordance with the illustrated example implementation, A/V system(s) 120 are cable ready, i.e., include the necessary tuner and demodulator hardware required to access broadcast programming information contained within the CATV signal. In alternate implementations wherein the AV system does not include the logic to demodulate the QAM digital signal, an additional set-top box (STB) (not shown) is required to demodulate the digital signal to an analog form expected by the tuners of the AV system 120.

Given the dual purpose of data enabled CATV systems, i.e., providing analog and digital programming as well as data channels, the cable modem has certain technical challenges that other broadband modems do not have to deal with. Given the typical implementation of 6 MHz channels over a spectrum of 91–857 MHz, one of the problems cable modems have is identifying which of the over 125 channels in the broadband signal are data channels, and which are allocated to other programming (e.g., A/V) channels. Conventional cable modems use one of a number of "brute force" methods to distinguish data channels from digital multimedia channels. According to one such method, a cable modem simply traverses each of the 130-plus channels, demodulating the content to determine whether the channel is a data channel. This solution is unpopular due to the fact that it is time consuming, often taking over a minute to complete this sweep and distinguish data channel(s) from digital media channels.

Another solution, implemented when the CATV system provider also distributes the cable modems is to group the data channels to a particular sub-band of channels within the CATV band. The cable modems are populated with a band-pass filter designed to constrain the channel sweep described above to the data channel sub-band pre-determined by the CATV operator. This solution has the obvious disadvantage that it fixed in hardware, and for the operator to extend the range of available data channels would require a hardware fix in the cable modems. In this regard, the modems are not readily amenable to upgrade.

BRIEF DESCRIPTION OF THE DRAWINGS

The present invention is illustrated by way of example, and not necessarily by way of limitation in the figures of the accompanying drawings in which like reference numerals refer to similar elements.

FIG. 5 illustrates a flow chart of an example method of identifying data channels within a plurality of multimedia channels in a cable network, according to one embodiment of the present invention;

DETAILED DESCRIPTION

This invention is generally drawn to improving the detection and acquisition of data channels by a cable modem. While conventional cable modems may well take over a minute to detect and acquire a data channel, the invention described herein will cut that time to mere seconds or less. In this regard, the discussion to follow introduces three alternative means by which such performance improvements may be achieved. The first of such means is implemented within the cable modem itself, requiring no modification or additions to the existing CATV infrastructure. In addition, two system-level approaches to improving a data channel detection and acquisition performance are presented. To facilitate each of these implementations, a channel detection agent is introduced in the cable modem to quickly distinguish data channels from digital media channels in a fraction of the time associated with conventional techniques. Accordingly, a system and related methods facilitating detection and acquisition of data channels by a cable modem is introduced herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Cable Modem Architecture

Figure 2:
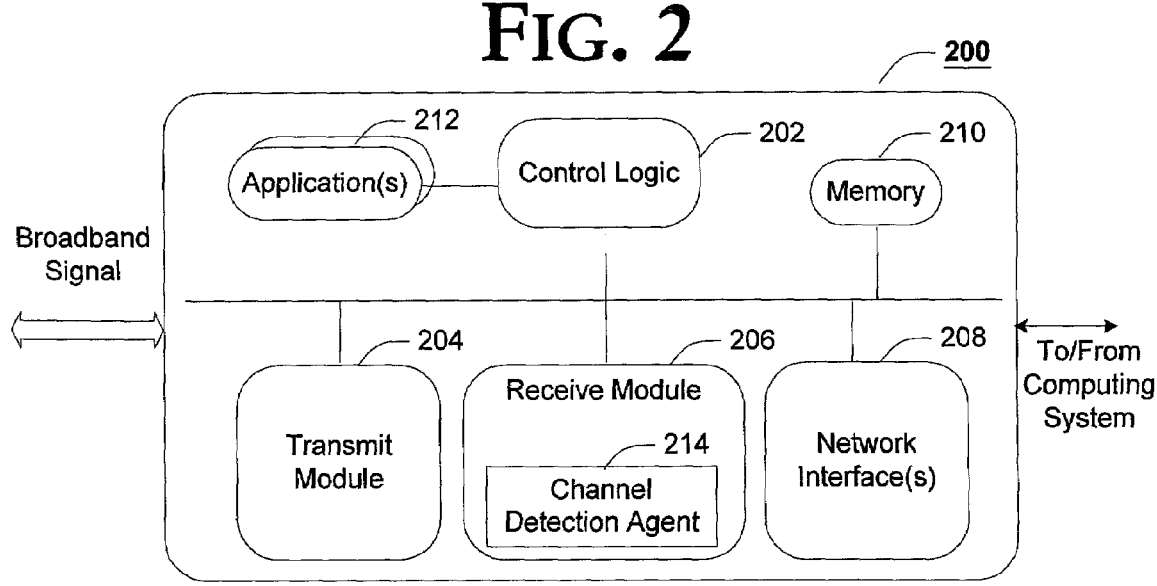
FIG. 2 is a block diagram of an example cable modem incorporating the teachings of the present invention, according to one example embodiment of the present invention.

FIG. 2 is a block diagram of an example cable modem incorporating a channel detection agent, in accordance with one embodiment of the present invention. In accordance with the illustrated example embodiment of FIG. 2, cable modem 200 is presented comprising control logic 202, a transmit module 204, a receive module 206, network interface(s) 208, memory/storage device 210 and one or more applications 212, coupled as shown. In accordance with the teachings of the present invention, modem 200 is presented comprising an innovative channel detection agent 214 which, as will be developed more fully below, enables cable modem 200 to detect and distinguish data channels from digital media channels in a fraction of the time associated with conventional cable modems. It should be appreciated that although depicted as a number of separate functional elements 202–214, one or more of such elements may well be integrated without deviating from the spirit and scope of the present invention Control logic 202 controls the overall function of the cable modem 200. In this regard, control logic 202 controls certain operational and timing for each of the transmit module 204, receive module 206 and channel detection agent 214. In accordance with one embodiment, control logic 202 controls tuning of the modem in response to the detection and acquisition of the data channel(s) by detection agent 214. In accordance with the illustrated example implementation, modem 200 includes applications 212 which are selectively invoked and implemented by control logic 202 to control certain operational aspects of cable modem 200. According to one example implementation of the present invention, to be described more thoroughly below, channel detection agent 214 is an application 212, which is selectively invoked by control logic 202 on start-up or reset of the cable modem to rapidly detect and acquire data channels in the received broadband signal. Thus, except as configured to effect the teachings of the present invention, control logic 202 is intended to represent any of a number of alternate control systems known in the art including, but not limited to, a microprocessor, a programmable logic array (PLA), a micro-machine, an application specific integrated circuit (ASIC) and the like. In an alternate implementation, control logic 202 is intended to represent a series of executable instructions to implement the control logic described above.

Network interface(s) 208 and memory 210 are each intended to represent any of a number of network interface(s) and memory devices known in the art. In this regard, network interface(s) are intended to represent any of a number of interface(s) used by modem 200 to interface with an HFC network, an local area network (LAN) or wide area network (WAN) element(s), any of a number of computing devices including, but not limited to, a personal computer, a set-top box, a personal digital assistant, and the like. Accordingly, network interface(s) 208 may well include one or more of a universal serial bus (USB) interface, a Personal Computing Interface (PCI) bus interface, an Ethernet interface, a wireless networking interface, an infrared interface, a serial bus interface, a parallel bus interface, a direct memory access (DMA) interface, an HFC network interface, and the like.

As used herein, memory 210 is used by control logic 202 to store and maintain a number of cable modem operating parameters such as, for example, look-up tables, data channel assignments, etc. In this regard, memory 210 is intended to represent one or more of volatile memory device(s), non-volatile memory device(s), mass storage device(s), optical storage device(s), and the like.

Transmit module 204 is intended to represent any of a wide variety of cable modem transmit devices known in the art. In accordance with one example implementation, transmit module 204 includes a QPSK/QAM-16 modulator which is selectively used by control logic 202 to transmit information from a coupled computing system (not shown) to a data network address via the HFC network (e.g., 100). According to one implementation, e.g., a DOCSIS compliant implementation, transmit module 204 transmits in one of the following channel widths (−30 dB bandwidth) of 200-kHz, 400-kHz, 800-kHz, 1.6-MHz, and/or 3.2-MHz from 5 to 42-MHz using Reed Solomon encoding and either QPSK and/or QAM 16 modulation techniques.

In accordance with the illustrated example implementation, receive module 206 is depicted comprising channel detection agent 214. The purpose of this illustration is not to define that channel detection agent 214 must be incorporated within receive module 206, but rather that certain operational characteristics of receive module 206 are temporarily modified by channel detection agent 214 during a start-up or reset period to rapidly detect and acquire data channels. As discussed above, channel detection agent 214 may well have been depicted as a separate, stand-alone element, or as one of a number of applications 212 executable by control logic 202. Thus, but for its ability to beneficially interact with and be controlled by channel detection agent 214, receive module 206 is intended to represent any of a number of broadband receivers known in the art. A more thorough architectural description of receive module 206, and its selective interaction with channel detection agent 214 is illustrated below, with reference to FIG. 3.

Example CM Receiver Architecture

Figure 3:
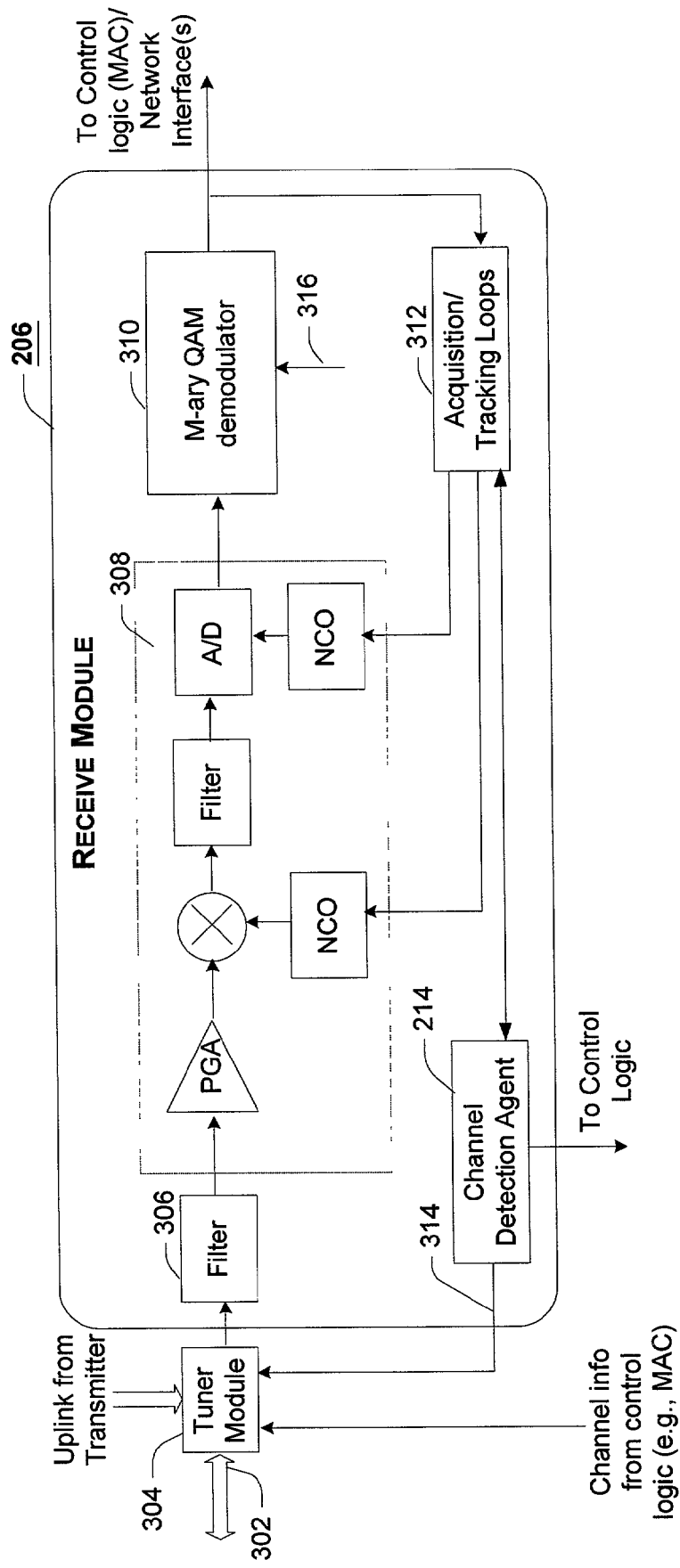
FIG. 3 is a graphical illustration of elements employed by a cable modem in the detection and acquisition of data channels, in accordance with one embodiment of the present invention.

Turning to FIG. 3, a operational block diagram of the elements employed by a cable modem in the detection and acquisition of data channels is introduced, in accordance with one embodiment of the present invention. In accordance with the illustrated example implementation of FIG. 3, a broadband signal 302 is received by a tuner module 304 and applied to a receiver 206 comprising a filter 306, an RF front end 308, an M-ary QAM demodulator 310, acquisition/tracking loops 312 and, in this illustrated example, a channel detection agent 214. It should be appreciated, however, that although depicted as a number of disparate functional elements, one or more of such elements may well be combined/integrated into multifunctional elements using, e.g., an application specific integrated circuit (ASIC) technology. Thus, it is not uncommon to find an integrated tuner/receiver, or broadband transceiver (i.e., with transmit and receive elements), and the like. Accordingly, cable modems of more or less complexity that utilize the teachings of the innovative detection agent 214 are anticipated within the scope and spirit of the present invention.

As shown in FIG. 3, a broadband signal 302 is received by a tuner module 304 and applied to receive module 206. In accordance with the illustrated example implementation, the tuner module 304 includes, for example, a tuning circuit, a diplex filter, and a programmable amplifier, and is shared between the transmit module 204 (e.g., to burst transmit an uplink signal to the cable modem termination system (CMTS)) as well as the receiver 206. According to one implementation, tuner module 304 is selectively controlled by control logic 202 implementing media access control (MAC) functions. In alternate embodiments, a distinct MAC controller may well be implemented within modem 200 to manage control of tuner module 304.

The receiver itself is depicted comprising a filter 306, designed to remove any noise artifacts remaining in the tuned channel and/or introduced within the tuner (e.g., from the uplink). Once filtered, the tuned channel is passed through an RF front end wherein it is downconverted to an IF frequency (e.g., 5 MHz) and digitized before being passed to the demodulator 310. In accordance with the illustrated example implementation of the cable modem 200, receiver 206 is depicted comprising an M-ary (e.g., 64/256) QAM demodulator 310, which demodulates the received digital signal to generate a representation of the originally transmitted baseband signal. As introduced above, QAM demodulation involves recovering information from both phase and frequency shifts in the modulated signal. The demodulated information is provided to a coupled computing system via network interface(s) 208.

Conventional modems include acquisition/tracking loops 312. The tracking loops 312 selectively control the numerically controlled oscillator(s) (NCO) of the RF front end 308 used to downconvert and digitize the received signal. In addition, acquisition/tracking loops 312 are used in conventional modems to determine whether a data channel has been demodulated. More particularly, as introduced above, conventional modems would sweep through the entire cable spectrum (91–857 MHz) one channel at a time to locate an active data channel. In so doing, the receive module 206 would completely demodulate the channel and check the output to determine whether the demodulated channel was a data channel.

In contradistinction to such conventional data channel detection and acquisition practices, the channel detection agent 214 of the present invention temporally modifies certain of the normal operating characteristics of the modem to more efficiently determine whether a given QAM channel is a data channel. In accordance with a first embodiment, to be discussed more fully below, channel detection agent 214 controls the demodulation attributes of the M-ary QAM demodulator 310 to perform only a first subset of QAM demodulation as a quick check to determine whether the channel is a data channel.

More particularly, in accordance with a first embodiment of the present invention, data channel detection agent 214 modifies certain of the cable modem parameters for low signal to noise ratio (SNR) and a wide auto-gain control (AGC) loop bandwidth and carrier loop bandwidth. Channel detection agent 214 then enables the adaptive equalizer (not shown) of QAM modulator in a QPSK mode, as the carrier frequency is swept over the entire bandwidth to obtain a lock. If carrier frequency lock is achieved, the channel is a data channel and the equalizer is reset to the proper QAM mode (e.g., 64-QAM) as the reset of the QAM channel acquisition is continued. If frequency lock is not achieved, the channel is not a data channel, and the channel detection agent 214 moves to the next QAM channel, to perform the same check. QPSK acquisition typically takes less than 10 ms per channel, whereas QAM acquisition can take 100 ms or more (for 256-QAM).

In accordance with our illustrated example implementation of a DOCSIS compliant broadband system, if carrier lock is achieved, channel detection agent 214 analyzes header information, e.g., a program identification (PID) field, to determine whether the channel comprises a data channel or a digital multimedia channel. In accordance with the DOCSIS protocol, the PID field in the header is used to indicate that the payload is DOCSIS data or multimedia content (e.g., video packets). Accordingly, by modifying QAM demodulator 310 to function in a short-term QPSK acquisition mode, channel detection agent 214 greatly reduces the amount of time necessary to identify active data channel(s).

In one implementation, channel detection agent 214 controls the demodulation characteristics of QAM demodulator 310 via control logic 202. Once the data channel is identified by channel detection agent 214, data channel information is provided to control logic 202, which stores and maintains the data channel tuning information in memory, e.g., memory 210.

In an alternate implementation, to be described more fully below, system level solutions to the identification of the data channel in a cable modem are presented. In accordance with a first, a modulator at, for example the CMTS (not shown)

introduces a pilot channel into the broadband signal at one or more of a plurality of frequencies within the broadband spectrum. In one implementation, the channel detection agent 214 is dynamically programmable by the CMTS to tune to a particular pilot channel (e.g., through pre-programming of a look-up table) to receive further information regarding active data channel(s). In such an embodiment, e.g., during downstream channel acquisition, channel detection agent 214 instructs the tuner module 304 (either directly or, perhaps, through some other control logic e.g., control logic 202) to tune to the pilot channel. The pilot channel includes cable system information including information regarding one or more cable modem operating characteristics such as, for example, data channel information. In this regard, the pilot channel may well include data channel operating parameters such as, for example, one or more of RF frequency(ies) with corresponding modulation format(s) (i.e., 64-QAM or 256-QAM), channel status, channel bandwidth, and the like. The pilot channel is demodulated and the operational parameters are provided to channel detection agent 214, e.g., via acquisition and tracking loops, whereupon channel detection agent 214 provides the data channel information to the control logic, e.g., control logic 202, for storage in memory 210, as above. It will be appreciated by those skilled in the art that the use of such a pilot channel allows the cable operator to re-allocate new or existing cable TV channels for cable modems depending on consumer demand.

In yet another alternate system-level embodiment, a modulator at, for example, the CMTS (not shown) introduces a pilot tone into the broadband spectrum in an active data channel(s) to provide an indication to the cable modem receiver 206 of the location of active data channel(s). In accordance with this example embodiment, the headend or CMTS introduces a tone (e.g., a continuous wave (CW)) tone to the in-phase (I) or quadrature (Q) branches of the QAM modulator (not shown) using a small baseband frequency (DC) offset. Accordingly, during a start-up or reset phase of operation, channel detection agent 214 quickly steps the tuner module 304 (perhaps via other control logic) through each of the QAM channels looking for the pilot tone. In accordance with one aspect of this implementation, channel detection agent 214 instructs the receiver 206 to remove the pilot tone when demodulating information for use by, for example, a coupled computing system. In addition to its use in rapid detection and acquisition of QAM data channel(s), the CW tone may also support other modem operations as well such as, for example, carrier recovery of the transmitted downstream QAM channel, particularly in the presence of channel impairments.

Accordingly, those skilled in the art will appreciate that channel detection agent 214 supports a number of alternate inventive techniques for rapidly and efficiently detecting a data channel within a broadband signal. In this regard, modems endowed with such a channel detection agent 214 will provide an end-user with improved start-up and reset performance leading to an improved customer experience when compared to conventional cable modems. In this regard, the channel detection agent 214 represents a new paradigm in data channel detection in a broadband signal.

Example Operation and Implementation

Figure 1:
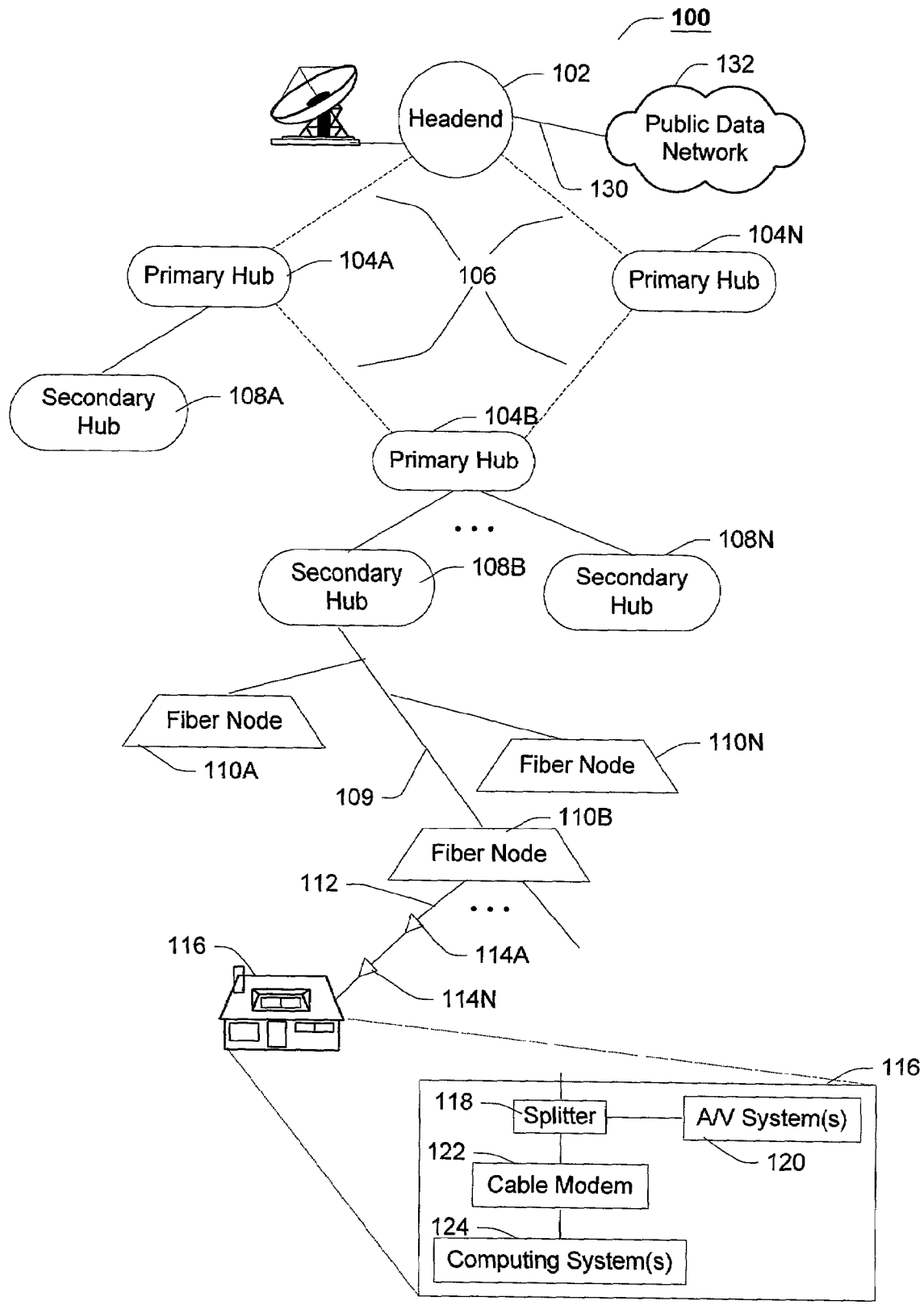
FIG. 1 is a block diagram of a hybrid fiber/coax (HFC) cable TV architecture within which the teachings of the present invention can be practiced, in accordance with one embodiment of the present invention.

Having introduced the functional and architectural elements of the present invention with reference to FIGS. 1 through 3, each of the illustrated example embodiments introduced above will be further developed with reference to FIGS. 4–7. For ease of illustration, and not limitation, the development of such alternate embodiments will be made with continued reference to the system and architectural detail of FIGS. 1–3.

Figure 4:
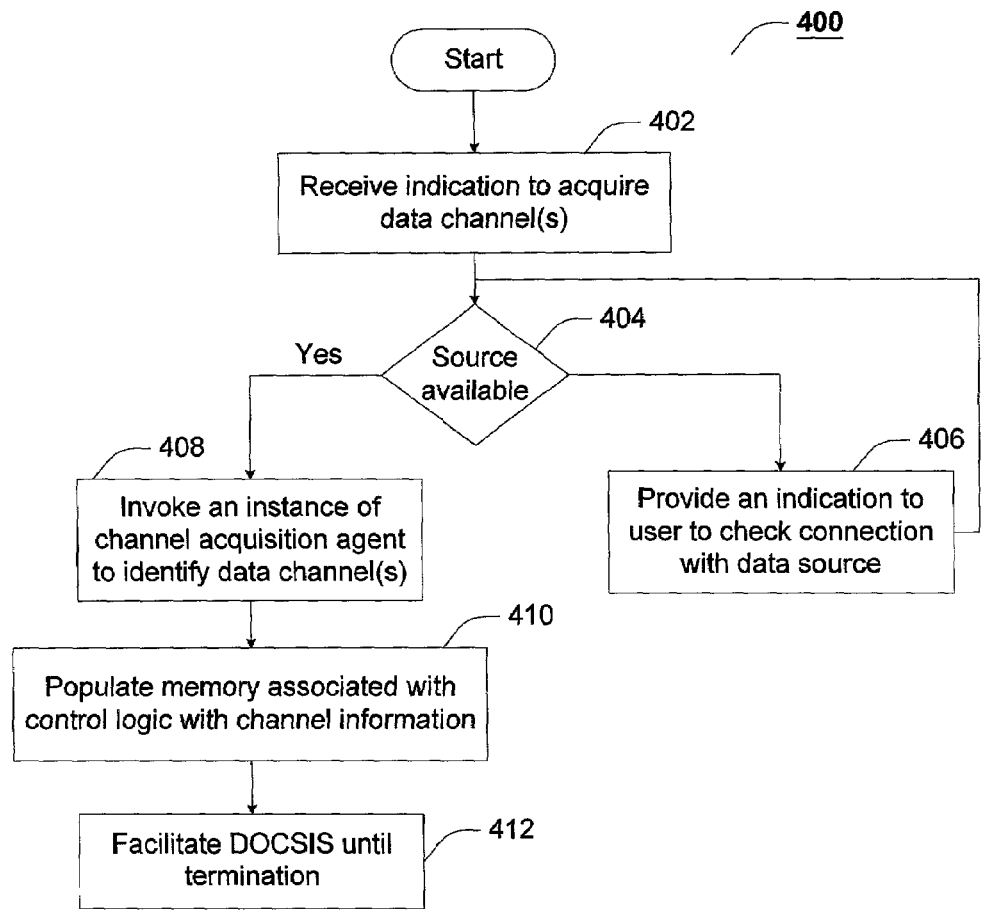
FIG. 4 is a flow chart of an example method for initiating data service in a cable modem, according to one embodiment of the present invention.

FIG. 4 is a flow chart of an example method for establishing data service in a cable modem, in accordance with a first embodiment of the present invention. In accordance with the illustrated example implementation of FIG. 4, the method begins with block 402 wherein the cable modem receives an indication to detect and acquire data channel(s). The indication may be received as a result of a power-on condition in the cable modem 200, a reset of the cable modem 200, etc.

In block 404, cable modem 200 determines whether a broadband source is available. According to one implementation, a small DC draw is taken from the broadband RF signal at the coaxial connection of the cable modem to power a light emitting diode (LED). Thus, when an active line is applied to the coax input of the cable modem 200, an LED will be illuminated to provide an indication to the user that the source is properly coupled. According to another implementation, receiver 206 confirms that a broadband source is available and, if not, provides control logic 202 with an indication that a source is not available. In response, control logic 202 provides an indication to a user to check the connection between the source and the cable modem.

If, in block 404 a source is available, cable modem 200 invokes an instance of channel detection agent 214 to identify one or more data channel(s) in the received broadband source, block 408. As introduced above and developed more fully below with reference to FIGS. 5–7, channel detection agent 214 facilitates one or more of three (3) alternate techniques for rapidly detecting data channels in the broadband signal.

Once detection agent 214 has identified the one or more data channels (block 408), operational information regarding the identified one or more data channel(s) is presented to control logic 202 of the modem, which populates one or more locations in memory 210 with the channel information, block 410. In accordance with one implementation, such data channel operational information is used by control logic (e.g., control logic 202) to control and manage the modem's interface with the uplink and downlink components of the broadband system. In this regard, for example, control logic 202 implementing media access control functionality controls the tuner module 304 to transmit and receive information over the appropriate QAM channel.

FIG. 5 illustrates a flow chart of an example method of identifying data channels within a plurality of multimedia channels in a cable network, according to one embodiment of the present invention. In accordance with the illustrated example implementation of FIG. 5, the method begins with block 502 wherein channel detection agent 214 eliminates from the search bandwidth channels associated with analog media content and/or other types of non-digital signal sources. In implementations where a system operator has aggregated such digital content to a particular spectrum within the broadband bandwidth (e.g., between 500–860-MHZ), and this information is available to the channel detection agent 214 via, for example, a pre-populated look-up table in memory 210, channel detection agent eliminates such spectrum from a list of QAM channels to be tested.

In block 504, channel detection agent 214 temporarily modifies certain of the operational parameters in the modem's receive module 206, implementing a short-term data channel acquisition mode. More particularly, as introduced above, channel detection agent 214 modifies the RF front end 308 of receiver 206 for a low signal to noise ratio (SNR), a wide AGC and carrier loop bandwidth. In addition, channel detection agent 214 activates an adaptive equalizer of the QAM demodulator 310 in a QPSK mode, which positions a slicer of the demodulator in an appropriate quadrant (e.g., of the I/Q constellation).

In block 506, channel detection agent 214 sweeps the carrier frequency over the loop bandwidth to search for carrier lock. In block 508, channel detection agent 214 determines whether carrier lock is achieved, denoting acquisition of a data channel, block 508. If carrier lock is not achieved, channel detection agent 214 steps tuner module 304 to the next QAM channel, block 510, and the process continues with another sweep of the carrier frequency through the loop bandwidth, block 506. As discussed above, sweeping the loop bandwidth to detect whether the channel is a data channel can typically be performed in less than 10 ms per QAM channel, nearly an order of magnitude less than conventional data channel acquisition techniques.

If, in block 508 channel detection agent 214 determines that carrier lock is achieved channel detection agent 214 concludes that the current QAM channel is an active data channel, block 512, and provides channel information to control logic 202 to facilitate further data communication via the cable network, block 514. In accordance with one implementation, the channel information includes one or more of a channel number, a carrier frequency, and the like.

Figure 6A:
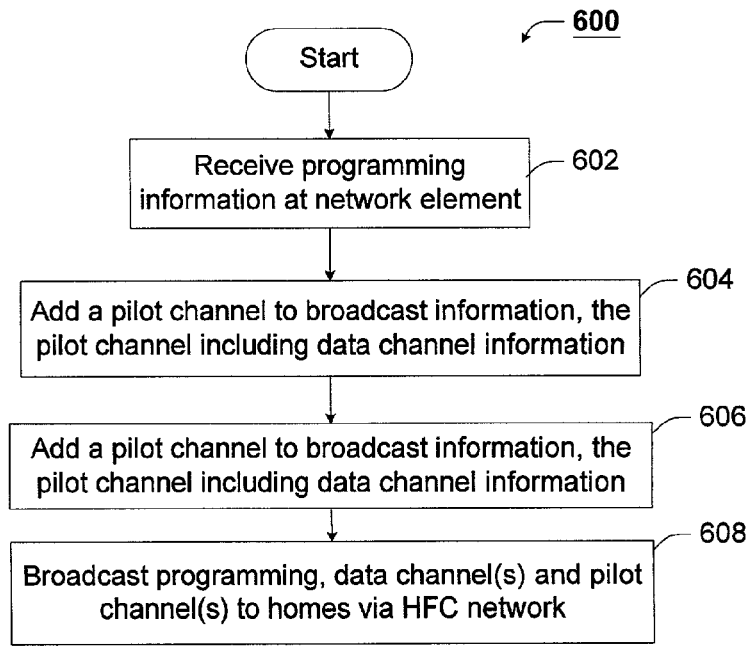
FIGS. 6A and 6B are flow charts associated with a system level approach to facilitating the detection and acquisition of data channels by a cable modem, in accordance with an alternative embodiment of the present invention.
Figure 6B:
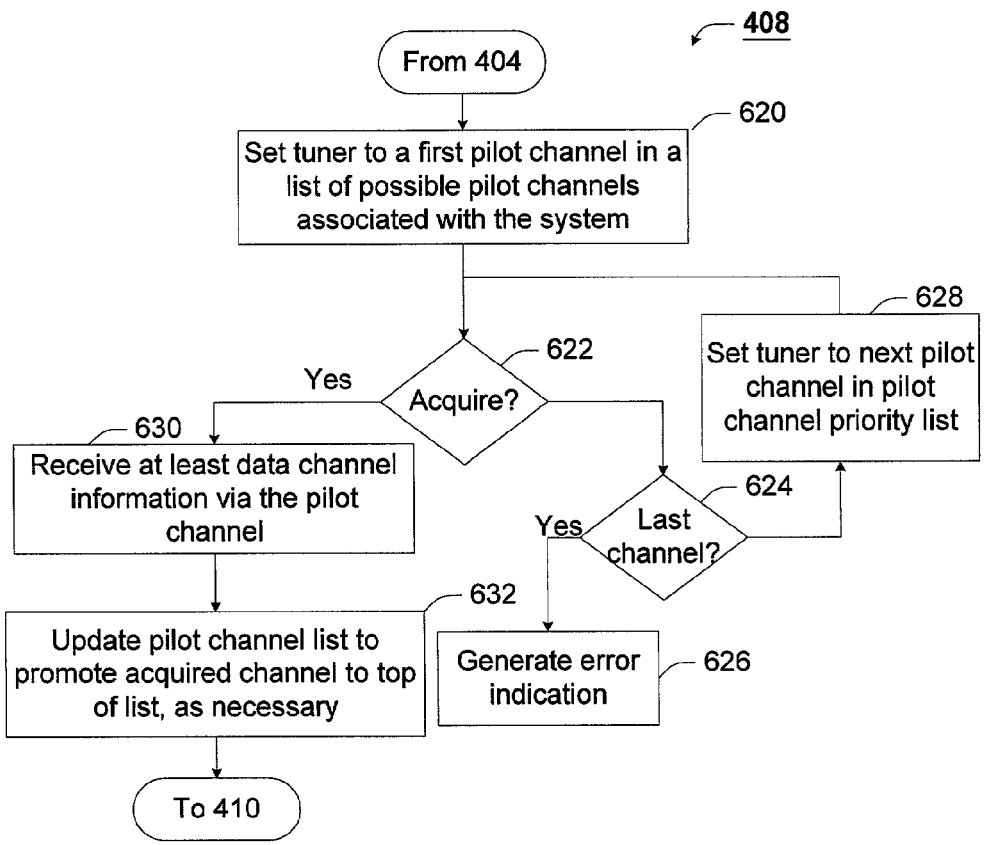

FIGS. 6A and 6B are flow charts associated with a system level approach to facilitating the detection and acquisition of data channels by a cable modem, in accordance with an alternative embodiment of the present invention. More particularly, FIG. 6A introduces the method steps of introducing a pilot channel to a QAM modulated broadband signal, while FIG. 6B introduces the method steps of detecting the pilot channel and extracting data channel programming information therefrom.

Turning to FIG. 6A, an example method for introducing a pilot channel into a broadband signal is presented. In accordance with the illustrated example implementation of FIG. 6A, the method begins with block 602 wherein a network element receives media programming information. In accordance with the illustrated example embodiment of FIG. 1, the network element is a master headend 102. In block 604, when preparing the media programming information for broadcast via the HFC network 100, a modulator in a network element adds a pilot channel to the broadcast information. In accordance with one implementation, the network element broadcasts a narrow band (e.g., 100 kHz) pilot channel at some known carrier frequency (e.g., 500 MHz). In concert, a network element (e.g., the master headend 102, a cable modem termination system (CMTS), etc.) is broadcasting continuously the cable modem channel information using a simple QPSK modulation format. The cable modem channel information may include downstream data channel frequencies, signal modulation formats (e.g., 64-QAM, 256-QAM, etc.) and other relevant parameters over this pilot channel.

In block 608, the broadband signal comprising the programming, data channel(s) and pilot channels is broadcast via the network 100 to local drops (e.g., within homes, business, etc.).

Turning to FIG. 6B, channel detection agent 214 sets the tuner to a first pilot channel in a list of possible pilot channels associated with the system, block 620. That is, in accordance with one example implementation, the cable modem is pre-populated with an updateable list of possible pilot channels, e.g., within memory 210. Upon start-up/reset channel detection agent 214 accesses memory 210 to find the list of pilot channels and begins the acquisition process by tuning to the first pilot channel.

In block 622, channel detection agent 214 determines whether the first pilot channel is active, i.e. includes a QPSK modulated signal. It is not necessary, for acquisition determination purposes to actually demodulate the signal. Rather, a simple check to determine whether the carrier includes a modulated signal provides the necessary indication of whether the pilot channel is active.

If the pilot channel is not active, channel detection agent 214 determines whether additional pilot channels are available, block 624. In accordance with one example implementation, once the channel detection agent 314 has traversed the pilot channel list, it concludes that the currently tuned channel is the last channel. If the pilot channel is not active, and the current channel is the last channel (block 624), channel detection agent 314 generates an error indication, block 626. In accordance with one example implementation, the error indication is sent to control logic 202 which provides a user with an error indication such as, e.g., changing the status of an LED indicator on the faceplate of the cable modem.

If, in block 624, channel detection agent 314 identifies additional potential pilot channels, channel detection agent 314 sets the tuner module 304 to the next pilot channel in the pilot channel list, block 628 and the process continues with block 622.

If, in block 622, an active pilot channel is identified, channel detection agent 214 temporarily modifies the operating parameters of the QAM receiver to demodulate the QPSK modulated information (e.g., as discussed above in FIG. 5) to receive at least data channel information via the pilot channel, block 626. As discussed above, the pilot channel information is provided to the necessary control logic (e.g., 202) to facilitate data communication over the specified data channel.

In block 628, channel detection agent 214 (perhaps through other control logic) updates the pilot channel list in memory 210 to promote the acquired pilot channel to the top of the list, as necessary. That is, to facilitate subsequent acquisition of pilot channels, i.e., on a subsequent power-up/reset condition, channel detection agent updates the dynamically modifiable pilot channel list with the latest pilot channel information.

Figure 7A:
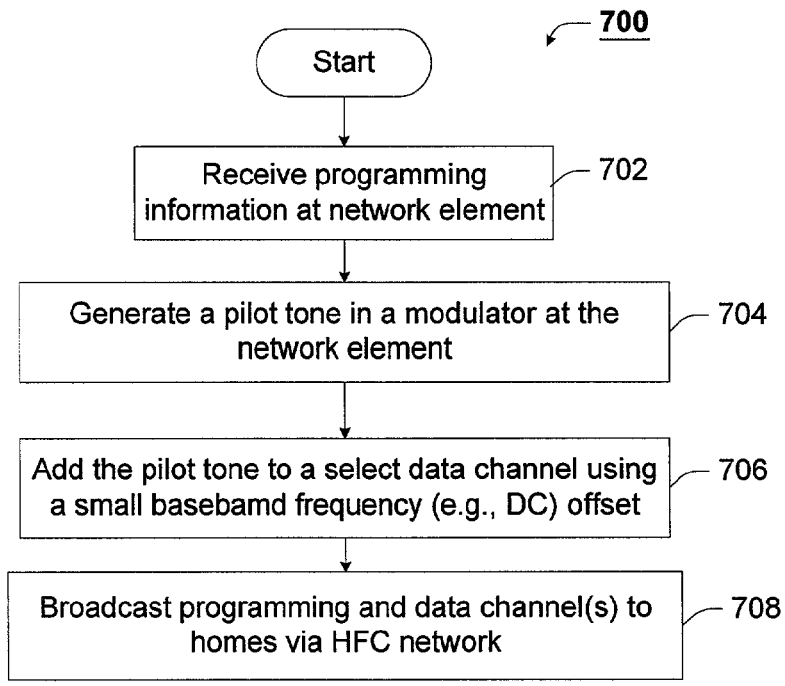
FIGS. 7A and 7B are flow charts associated with a system level approach to facilitating the detection and acquisition of data channels by a cable modem, in accordance with yet another alternative embodiment of the present invention.
Figure 7B:
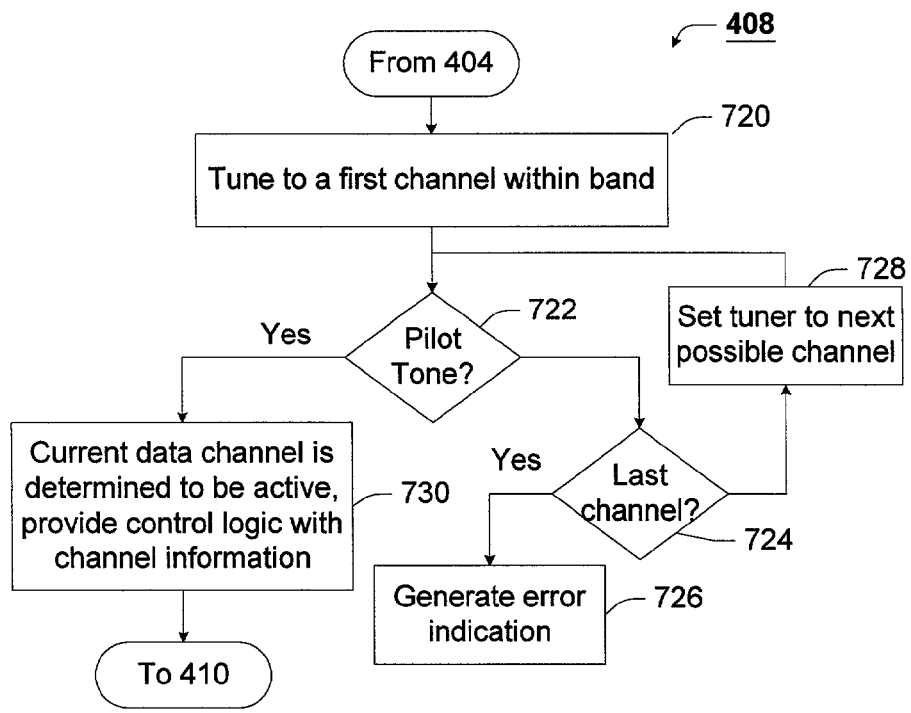

FIGS. 7A and 7B are flow charts associated with a system level approach to facilitating the detection and acquisition of data channels by a cable modem, in accordance with yet another alternative embodiment of the present invention. More particularly, FIG. 7A is drawn to an example method of introducing a pilot tone into a data channel to "mark" the channel for detection by the modem, while FIG. 7B is drawn to an example method for detecting a pilot tone in a QAM modulated signal.

Turning to FIG. 7A, an example method for introducing a pilot channel into an active data channel is presented, in accordance with one embodiment of the present invention. As shown, the method begins with block 702 wherein a network element (e.g., a headend, CMTS, etc.) receives programming information. In block 704, a continuous wave (CW) tone is generated. Insofar as the operational characteristics of the tone itself are irrelevant, any of a number of means may be employed to generate the tone.

In block 706, the generated tone is added to a select data channel using a baseband frequency (e.g., DC) offset. More particularly, in accordance with one example implementation, the QAM modulator introduces the CW tone in the form of a baseband frequency offset in one or more of the in-phase (I) or quadrature-phase (Q) signal components prior to combining and QAM modulation of the components.

In block 708, the broadband signal comprising programming channels and at least one marked data channel is transmitted to terminal drops via the broadband network (e.g., HFC network 100).

Turning to FIG. 7B, an example method of detecting a marked data channel is presented, in accordance with another embodiment of the present invention. As shown, the method begins with block 720, wherein channel detection agent 214 instructs tuner module 304 to tune to a first possible channel within the broadband spectrum. In block 722, channel detection agent 214 determines whether the pilot tone "marker" is evident within the channel. In accordance with one example implementation, channel detection agent 214 analyzes the channel components to detect the baseband frequency offset. That is, an initial QAM demodulation is performed and channel detection agent 314 performs a check to determine if the I and Q components of the channel are offset from one another. In an alternate implementation, further receive processing is performed, as necessary, to detect whether a CW tone is evident.

If, in block 722, channel detection agent 214 does not detect the pilot tone, channel detection agent 314 determines whether additional channels are available, block 724. In accordance with one example implementation, once the channel detection agent 314 has traversed the all of the channels within the broadband spectrum, it concludes that the currently tuned channel is the last channel. If the channel does not include a pilot tone, and the current channel is the last channel (block 724), channel detection agent 314 generates an error indication, block 726. In accordance with one example implementation, the error indication is sent to control logic 202 which provides a user with an error indication such as, e.g., changing the status of an LED indicator on the faceplate of the cable modem.

If, in block 724, channel detection agent 314 identifies additional channels, channel detection agent 314 sets the tuner module 304 to the next channel, block 728 and the process continues with block 722.

Alternatively, if channel detection agent 214 does identify the pilot tone in block 722, channel detection agent 214 determines that the currently tuned channel is an active data channel, and provides control logic with channel information, block 726.

Although illustrated above as independent implementations, those skilled in the art will appreciate that certain aspects of each of the foregoing embodiments may well be combined to provide channel detection improvements over the prior art. For example, the pilot tone embodiment of FIGS. 7 can be combined with the pilot channel embodiment of FIGS. 6 to alleviate the need of pre-populating the cable modem with a list of potential pilot channels. Rather, channel detection agent 214 scans possible pilot channels in search of the pilot tone, and subsequently downloads active channel information for use in subsequent power-up/restart situations without the need of a pre-populated list of potential pilot channels. Accordingly, further embodiments taking elements from two or more of the illustrated example embodiments are anticipated within the scope and spirit of the present invention.

Alternate Embodiments

Figure 8:
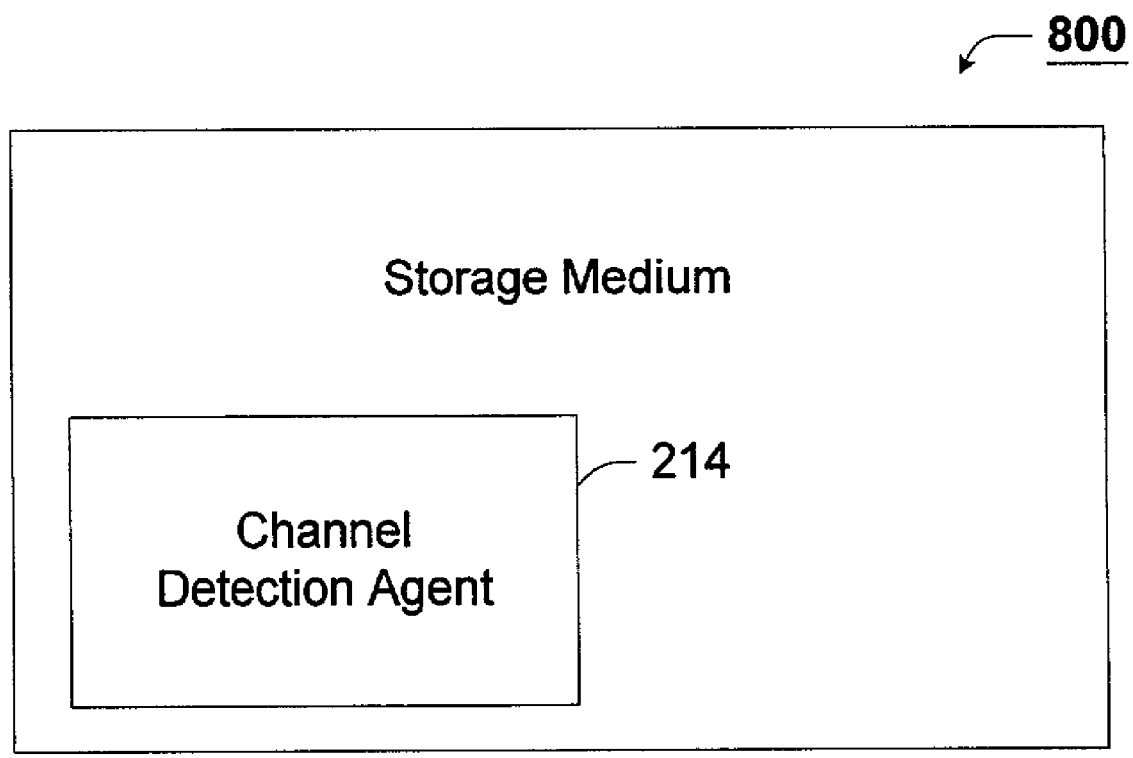
FIG. 8 graphically illustrates an example storage medium comprising a plurality of instructions which, when executed, cause an executing machine to implement the teachings of the present invention in accordance with yet another embodiment of the present invention.

FIG. 8 is a block diagram of a storage medium having stored thereon a plurality of instructions including instructions to implement the channel detection agent 214, according to yet another embodiment of the present invention. In general, FIG. 8 illustrates a storage medium/device 800 having stored thereon a plurality of machine-executable instructions including at least a subset of which that, when executed, implement the innovative diversity agent 214 of the present invention.

As used herein, storage medium 800 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, extensible Markup Language (XML), and the like. Moreover, it is to be appreciated that the storage medium/device 800 need not be co-located with any host system. That is, storage medium/device 800 may well reside within a remote server communicatively coupled to and accessible by an executing system. Accordingly, the software implementation of FIG. 8 is to be regarded as illustrative, as alternate storage media and software embodiments are anticipated within the spirit and scope of the present invention.

Although the invention has been described in the detailed description as well as in the Abstract in language specific to structural features and/or methodological steps, it is to be understood that the invention defined in the appended claims is not necessarily limited to the specific features or steps described. Rather, the specific features and steps are merely disclosed as exemplary forms of implementing the claimed invention. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

In accordance with the foregoing, we claim the following:
The invention claimed is:

1. A method comprising:
receiving a broadband signal at a receiver in accordance with a first modulation technique;
tuning the receiver to a channel within the broadband signal; and
modifying one or more operational parameters of the receiver to demodulate the channel in accordance with a second modulation technique to determine whether the channel is a data channel by adjusting a demodulator associated with the first modulation technique to demodulate the received channel in accordance with the second modulation technique, sweeping a carrier frequency through a loop bandwidth of the channel until carrier frequency lock is achieved, and determining that the channel is an active data channel if carrier frequency lock is achieved.

2. A method according to claim 1, wherein the broadband signal is a quadrature amplitude modulated (QAM) cable television signal.

3. A method according to claim 1, wherein determining that the channel is an active data channel comprises:

analyzing channel header information of the broadband signal to identify a multimedia programming identifier, wherein the absence of such an identifier is indicative of a data channel.

4. A method according to claim 1, further comprising:
tuning the receiver to another channel if carrier lock is not achieved through the loop bandwidth of the channel; and
repeating the adjusting, sweeping, determining and tuning until carrier frequency lock is achieved within the loop bandwidth of one of the channels within the broadband spectrum identifying an active data channel within the broadband spectrum.

5. A method according to claim 4, further comprising:
modifying the demodulator to demodulate the identified channel in accordance with the first modulation technique.

6. A method according to claim 5, further comprising:
updating receiver operating information to denote the identified active data channel.

7. A method according to claim 1, wherein the second modulation technique is a quadrature phase shift-keying (QPSK) modulation technique.

8. A method according to claim 7, wherein adjusting the demodulator comprises:
setting a quadrature amplitude modulation (QAM) demodulator of the receiver to demodulate the channel using a quadrature phase shift-keying (QPSK) technique.

9. A machine accessible storage medium comprising a plurality of executable instructions which, when executed by an accessing machine, implement a method according to claim 1.

10. A method comprising:
receiving a broadband signal at a receiver in accordance with a first modulation technique;
tuning the receiver to a channel within the broadband signal;
modifying one or more operational parameters of the receiver to demodulate the channel in accordance with a second modulation technique to determine whether the channel is a data channel;
sweeping a carrier frequency through a loop bandwidth of the channel to until carrier frequency lock is achieved; and
determining that the channel is an active data channel if carrier frequency lock is achieved.

11. A method according to claim 10, wherein determining that the channel is an active data channel comprises:
analyzing channel header information of the signal to determine payload content.

12. A method according to claim 11, wherein analyzing channel header information comprises:
locating a programming identification (PID) field; and
determining whether the PID field contains a multimedia programming identifier to denote that the channel is a multimedia channel.

13. A method according to claim 12, further comprising:
identifying the channel as a data channel if the PID field does not contain a multimedia programming identifier.

14. A machine accessible storage medium comprising a plurality of executable instructions which, when executed by an accessing machine, implement a method according to claim 10.

15. A machine accessible storage medium comprising a plurality of executable instructions which, when executed by an accessing machine, cause the machine to implement a channel detection agent to modify at least the demodulation technique of a broadband receiver to identify digital channels in a broadband signal by tuning a broadband receiver to a channel within the received broadband signal, the broadband signal modulated in accordance with a first modulation technique, and modifying one or more operational parameters of the receiver to demodulate the channel in accordance with a second modulation technique to determine whether the channel is a data channel, to analyze at least a subset of header information of identified digital channels to distinguish digital data channels from digital media channels, to sweep a carrier frequency through a loop bandwidth of the channel demodulated in accordance with the second modulation technique until carrier frequency lock is achieved, and to determine that the channel is an active data channel if carrier frequency lock is achieved.

16. A machine accessible storage medium according to claim 15, further comprising instructions to:
analyze channel header information of the demodulated signal to identify a multimedia programming identifier, wherein the absence of such an identifier is indicative of a data channel.

17. A machine accessible storage medium according to claim 15, further comprising instructions to:
tune the receiver to another channel if carrier lock is not achieved through the loop bandwidth of the channel; and
repeat the, sweeping, determining and tuning until carrier frequency lock is achieved within the loop bandwidth of one of the channels within the broadband spectrum and an active data channel is identified.

18. A machine accessible storage medium according to claim 15, wherein the first modulation technique is a quadrature amplitude modulation (QAM) technique.

19. A machine accessible storage medium according to claim 15, wherein the instructions implementing the channel detection agent, when invoked, cause a quadrature amplitude modulation (QAM) receiver to demodulate a received signal in accordance with a quadrature phase shift-keying (QPSK) demodulation technique.

20. A computing device comprising:
a storage medium comprising a plurality of executable instructions; and
a control unit, coupled to the storage medium, to selectively execute at least a subset of the plurality of instructions to implement a data channel detection agent to modify at least a demodulation technique of an accessible broadband receiver to enable the agent to identify digital channels in a broadband signal, and to analyze at least a subset of header information of identified digital channels to distinguish digital data channels from digital media channels, wherein the data channel detection agent interacts with the broadband receiver to tune the broadband receiver to a channel within the received broadband signal, the broadband signal modulated in accordance with a first modulation technique, and to modify one or more operational parameters of the receiver to demodulate the channel in accordance with a second modulation technique to determine whether the channel is a digitally modulated channel, the data channel detection agent further comprising instructions which, when issued to the receiver, cause the receiver to sweep a carrier frequency through a loop bandwidth of the channel demodulated in accordance with the second modulation technique until carrier frequency lock is achieved, wherein the channel detection agent determines that the channel is a digitally modulated channel if carrier frequency lock is achieved.

21. A computing device according to claim 20, wherein the channel detection agent analyzes channel header information of the demodulated signal to identify a multimedia programming identifier, wherein the absence of such an identifier is indicative of a data channel.

22. A computing device according to claim 21, wherein the channel detection agent tunes the receiver to another channel to identify a data channel if carrier lock is not achieved through the loop bandwidth of the channel.

23. A computing device according to claim 20, wherein the channel detection agent issues instructions to modify a quadrature amplitude modulation (QAM) receiver to demodulate a received signal in accordance with a quadrature phase shift-keying (QPSK) demodulation technique.

24. A computing device according to claim 20, wherein the computing device is a cable modem.

* * * * *